(12) United States Patent
Qian et al.

(10) Patent No.: US 9,714,179 B2
(45) Date of Patent: Jul. 25, 2017

(54) PROCESS FOR FEED-WATER OXYGENATING TREATMENT IN BOILER IN POWER STATION

(75) Inventors: Zhouhai Qian, Zhejiang (CN); Liwei Zhu, Zhejiang (CN); Qiuyang Cao, Zhejiang (CN); Shenglin Pang, Zhejiang (CN); Likui Feng, Zhejiang (CN); Xiulin Xiao, Zhejiang (CN); Chen Zhou, Zhejiang (CN); Canfei Hong, Zhejiang (CN)

(73) Assignee: Z (P) EPC Electric Power Research Institute, Beijing (CN)

( * ) Notice: Subject to any disclaimer, the term of this patent is extended or adjusted under 35 U.S.C. 154(b) by 246 days.

(21) Appl. No.: 13/980,534

(22) PCT Filed: Mar. 20, 2012

(86) PCT No.: PCT/CN2012/072607
§ 371 (c)(1),
(2), (4) Date: Oct. 30, 2013

(87) PCT Pub. No.: WO2013/138993
PCT Pub. Date: Sep. 26, 2013

(65) Prior Publication Data
US 2014/0042104 A1 Feb. 13, 2014

(51) Int. Cl.
*C02F 1/02* (2006.01)
*C02F 1/72* (2006.01)
(Continued)

(52) U.S. Cl.
CPC .............. *C02F 1/727* (2013.01); *C02F 1/20* (2013.01); *C23F 14/02* (2013.01); *C23F 15/00* (2013.01);
(Continued)

(58) Field of Classification Search
None
See application file for complete search history.

(56) References Cited

U.S. PATENT DOCUMENTS

2011/0318223 A1* 12/2011 Miyazaki ............. G21D 1/02
422/7

FOREIGN PATENT DOCUMENTS

| CN | 101423282 | 5/2009 |
| CN | 101851020 | 10/2010 |
| (Continued) | | |

OTHER PUBLICATIONS

Full translation of Suzuki, et al., JP Patent # 58-207378A, pp. 1-12.*
(Continued)

*Primary Examiner* — Clare Perrin
(74) *Attorney, Agent, or Firm* — Brinks Gilson & Lione

(57) ABSTRACT

The present invention provides a process of oxygenated feed-water treatment of boilers in power station, carried out under an OT treatment process, suitable for both the monotube type boiler and the drum type boiler, and comprising an oxygenation stage comprising: a normal oxygenation converting stage and a decreased oxygenation film-supplementing stage; the normal oxygenation converting stage is a stage in which the feed water system is oxygenated both at the outlet of a condensate polishing system and at the inlet of a feed water pump of a high pressure feed water system, and the concentration of dissolved oxygen in the main steam is controlled to be ≤5 μg/L; the decreased oxygenation film-supplementing stage is a stage in which, after an oxide film is formed in the feed water system, the amount of oxygenation at the high pressure feed water system is decreased so that the amount of the oxygen added is only for supplementing and maintaining the oxide film, while the concentration of dissolved oxygen in the main steam is controlled to be ≤5 μg/L. It can ensure that a dense protection film can be
(Continued)

formed and maintained on the metal surface of the pipes in a feed water system, thereby reducing the iron content in the feed water; excessive oxygen is prevented from entering the high temperature heating surface and causing the peeling off of the oxide skin; and the amount of oxygen consumed is significantly reduced, thereby decreasing the amount of maintenance.

4 Claims, 1 Drawing Sheet

(51) Int. Cl.
*C02F 1/20* (2006.01)
*C23F 14/02* (2006.01)
*C23F 15/00* (2006.01)
*C02F 1/68* (2006.01)
*B01J 10/00* (2006.01)
*C23F 11/00* (2006.01)
*F22B 1/00* (2006.01)
*C02F 1/64* (2006.01)

(52) U.S. Cl.
CPC ...... *C02F 1/02* (2013.01); *C02F 1/64* (2013.01); *C02F 2209/22* (2013.01); *C02F 2303/08* (2013.01); *F22B 1/00* (2013.01)

(56) References Cited

FOREIGN PATENT DOCUMENTS

| CN | 101851020 A | * | 10/2010 | |
|---|---|---|---|---|
| CN | 101880092 | | 11/2010 | |
| CN | 102070254 | | 5/2011 | |
| JP | 58207378 A | * | 12/1983 | |
| JP | WO 2010104062 A1 | * | 9/2010 | ............... C02F 9/00 |
| RU | 2064151 C1 | | 7/1996 | |

OTHER PUBLICATIONS

Full translation of Qian, et al. (CN Patent # 101851020), pp. 1-26.*
International Search Report, International Application No. PCT/CN2012/072607, Jan. 3, 2013, 8 pages.

* cited by examiner

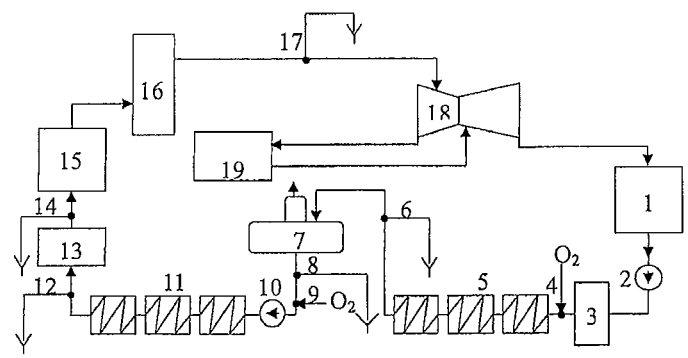

PROCESS FOR FEED-WATER OXYGENATING TREATMENT IN BOILER IN POWER STATION

This application is the National Stage of International Application No. PCT/CN2012/072607, filed Mar. 20, 2012, which is entitled "PROCESS FOR FEED-WATER OXYGENATING TREATMENT IN BOILER IN POWER STATION," the contents of which is incorporated herein by reference in its entirety.

FIELD OF THE INVENTION

The present invention relates to the field of feed-water treatment of a boiler, and in particular, to the process of oxygenated feed-water treatment of a boiler in power station.

BACKGROUND

At present, there are three main treatment processes adopted for feed-water treatment of a boiler in power station at home or abroad, that is, the all volatile treatment (reduction) (AVT-R), the all volatile treatment (oxide) (AVT-O), and the oxygenated treatment (OT).

The AVT-R and the AVT-O can reduce the dissolution and deposition of the product of corrosion to some extent, but is significantly insufficient for inhibiting the flow accelerated corrosion (FAC) of a feed-water system. In particular, for some power sets adopting the AVT-R and the AVT-O, there are significantly excessive content of iron ions in the feed water, which directly leads to a series of problems such as high scaling rate, the deposition of iron scale on the blades of a steam turbine, etc. with regard to monotube type boilers, bringing about significant decrease in the efficiency of the power sets. Under this circumstance, most of the feed-water systems in monotube type boilers at abroad adopt relatively advanced OT process.

The OT process is initially developed by West Germany in 1970s. The guidelines for oxygenated treatment were officially established by the Welding & Repair Technology Center (WRTC) in the United States at the earlier 1990s. New guideline of oxygenated treatment was revised in China in 2011. In comparison with the AVT-O, the OT process can effectively inhibit FAC, since high purity oxygen is continuously supplied to the feed-water system in the OT process, which generates dense oxide films on the inner metallic wall of the feed-water system, and in turn effectively slows down the development of corrosion.

However, there are some disadvantages in the OT processes, that is, due to some concentration of dissolved oxygen maintained in the main steam, as required when performing the OT process (DL/T 805.1-2011 *Guidelines of Oxygenated Feed-Water Treatment of Boilers* requires a dissolved oxygen of ≥10 µg/L in the main steam), the peeling off of the oxide skin from the high-temperature heated surface (including the superheater, the reheater, the water cooling wall, etc.) made of some steels (for example, TP347) might occur, which may lead to the explosion of the heating pipes once being blocked by the oxide skin peeled off.

SUMMARY OF THE INVENTION

The technical problem to be resolved is to provide a process of oxygenated feed-water treatment of boilers in a power station, which can inhibit the FAC of boilers brought about by conventional OT process, while eliminating the peeling off of oxide skin from the high temperature heating surface of boilers caused by the same.

In order to resolve the above technical problem, the present invention adopts the following technical solution:
a process of oxygenated feed-water treatment of boilers in a power station, carried out in an OT treatment process for the feed water of a boiler, suitable for a monotube type boiler and a drum type boiler, and comprising an oxygen-adding stage comprising:
a normal oxygenation converting stage and a decreased oxygenation film-supplementing stage;

The normal oxygenation converting stage is a stage in which the feed water system is added with oxygen both at the outlet of a condensate polishing system and at the inlet of a feed water pump of a high pressure feed water system, and the concentration of dissolved oxygen in the main steam is controlled to be ≤5 µg/L;

The decreased oxygenation film-supplementing stage is a stage in which, after an oxide film is formed in the feed water system, the amount of oxygen added at the high pressure feed water system is decreased so that the amount of oxygen added is only for supplementing and maintaining the oxide film, while the concentration of dissolved oxygen in the main steam is controlled to be ≤5 µg/L.

Preferably, in the normal oxygenation converting stage, the amount of oxygen added at the outlet of the condensate polishing system is 50 µg/L~150 µg/L, and the amount of oxygen added at the inlet of the feed water pump of the high pressure feed water system is 50 µg/L~150 µg/L.

Preferably, the transition point from the normal oxygenation converting stage to the decreased oxygenation film-supplementing stage is: the concentration of iron ions in the high pressure feed water system keeps stable at ≤1 µg/L, and the amount of dissolved oxygen thereof is 95%~100% of the amount of oxygen added at the inlet of the feed water pump of the high pressure feed water system.

Preferably, in the decreased oxygenation film-supplementing stage, the amount of oxygen added at the outlet of the condensate polishing system is 50 µg/L~150 µg/L, and the amount of oxygen added in the high pressure feed water system is ≤30 µg/L.

Preferably, the amount of oxygen added in the high pressure feed water system is 5 µg/L~15 µg/L.

Preferably, the method for decreasing the amount of oxygen added in the high pressure feed water system comprises reducing the amount of oxygen added at the inlet of the feed water pump of the high pressure feed water system or adjusting the exhaust valve of a deaerator.

Based on the conventional OT treatment process for a boiler, the present invention divides the oxygen-adding process into a normal oxygenation converting stage and a decreased oxygenation film-supplementing stage, that is, after the oxygen-adding process in the first stage is completed, the amount of oxygen added in the feed water is precisely controlled, and the amount of dissolved oxygen in the main steam is controlled as well. The present oxygenating treatment process is adapted to a monotube type boiler and a drum type boiler. It can ensure that a dense protection film can be formed and maintained on the metal surface of the pipes in a feed water system, thereby reducing the iron content in the feed water; the amount dissolved oxygen in the main steam is controlled, preventing excessive oxygen from entering the high temperature heating surface and causing the peeling off of the oxide skin; and the amount of oxygen consumed is significantly reduced, so that the amount of oxygen consumed under normal operation conditions is only ⅓ to ⅕ of that in the conventional OT method, thereby decreasing the amount of maintenance.

BRIEF DESCRIPTION OF DRAWINGS

FIG. 1 is a schematic representation of the feed water system for a boiler and the oxygen-adding points thereof according to one embodiment.

The numerals in the FIGURE represent:

1. condenser; 2. condensate pump; 3. condensate polishing system; 4. oxygen-adding point at the outlet of the condensate polishing system; 5. low-pressure heater; 6. sampling point at the inlet of the deaerator; 7. deaerator; 8. sampling point at the outlet of the deaerator; 9. oxygen-adding point of the feed water system; 10. feed water pump; 11. high pressure heater; 12. feed water sampling point; 13. coal economizer; 14. sampling point at the inlet of the water wall; 15. water wall 16. superheater; 17. sampling point of the main steam; 18. turbine; 19. reheater.

DETAILED DESCRIPTION

The preferred embodiments of the present invention will be described for further understanding of the invention. However, it should be understood that, these descriptions are merely made for further explaining the features and advantages of the present invention, rather than imposing any limitation to the claims of the present invention.

The process of oxygenated feed-water treatment for a boiler in power station provided by the present invention is a modified process of oxygenation based on the conventional boiler feed-water OT treatment process, suitable for both the monotube type boiler and the drum type boiler. The boiler feed water system of the monotube type boiler and the drum type boiler are shown in FIG. 1, which is a schematic representation of the boiler feed water system and the oxygen-adding points thereof according to one embodiment of the present invention.

The water-steam circulation in the system comprises: the condensate in the condenser 1 is fed into the condensate polishing system 3 via the condensate pump 2, where it is turned into high purity water by purification of the condensate polishing system 3; the high purity water is added with high purity oxygen from the low pressure feed water system (mainly comprising the piping system from the condensate polishing system 3 to the deaerator 7) at the oxygen-adding point 4 at the outlet of the condensate polishing system 3, sequentially flowed through the low pressure heater 5 and the deaerator 7, and added with high purity oxygen from the high pressure feed water system (mainly comprising the piping system from the exit of the water pump 10 to the coal economizer 13) at the oxygen-adding point 9 of the feed water system; the high purity water added with oxygen is then sequentially flowed through the coal economizer 13, and the water wall 15, where it is turned into saturated steam by absorbing heat from the water wall 15; the saturated steam enters the superheater 16 and become superheated steam by further absorbing heat, that is, the main steam, which enters the condenser 1 after flows through the turbine 18 and the reheater 19. In the condenser 1 the main stream is condensed into water; thereby a water-steam cycling process is completed.

In the above circulation, the oxygen-adding process is divided into two stages, that is, the normal oxygenation converting stage and the decreased oxygenation film-supplementing stage. In the normal oxygenation converting stage, the present invention adds high purity oxygen both at the oxygen-adding point 4 at the outlet of the condensate polishing system of the feed water system, and at oxygen-adding point 9 at the inlet of feed water pump 10, by an amount of oxygen added between 50 µg/L~150 µg/L, while the concentration of the dissolved oxygen in the main steam is controlled to be ≤5 µg/L. For the steady progress of the oxygenation, the hydrogen conductivity of the water and steam is controlled to be ≤0.15 µS/cm before the normal oxygenation converting stage, and the hydrogen conductivity of the water and steam is controlled to be ≤0.20 µS/cm during the normal oxygenation converting stage.

When the concentration of iron ions at the water sampling point 12 keeps stable at ≤1 µg/L for a long time and the amount of dissolved oxygen is 95%~100% of the amount of oxygen added at the oxygen-adding point 9 of feed water system, the normal oxygenation converting stage ends, and the decreased oxygenation film-supplementing stage starts.

In the decreased oxygenation film-supplementing stage, the amount of oxygen added at the outlet of the condensate polishing system remains at 50 µg/L~150 µg/L, but the amount of oxygen added in the high pressure feed water system is reduced to ≤30 µg/L so that the oxygen added can only supplement and maintain the oxide film, while the concentration of the dissolved oxygen in the main steam is controlled to be ≤5 µg/L. For the steady progress of the oxygenation, the hydrogen conductivity of the water and steam is controlled to be ≥0.150/cm in the decreased oxygenation film-supplementing stage. Reducing the amount of oxygen added in the high pressure can be performed by reducing the amount of oxygen added at the oxygen-adding position 9 of feed water system, or by adjusting the exhaust valve of the deaerator.

Throughout the process of the present invention, the sampling point 6 at the inlet of the deaerator, the sampling point 8 at the outlet of the deaerator, the feed-water sampling point 12, the sampling point 14 at the inlet of the water wall, and the main steam sampling point 17 are closely detected in term of the content of dissolved oxygen, and the amount of oxygen added is real-time controlled according to the result obtained by the detection, so that the concentration of dissolved oxygen at the main steam sampling point 17 is controlled to be ≤5 µg/L, thereby preventing excessive oxygen from adversely affecting the high-temperature heated surface.

EXAMPLE 1

Before carrying out the process of the present invention, the content of iron ions in the feed water in the monotube type boiler unit of 1000 MW supercritical unit somewhere in Zhejiang Province was sometimes out of the standard, with an average content of iron ions in the feed water of 1.92 µg/L, and a maximum of up to 14 µg/L. The deposition of metal corrosion product frequently occurs at the throttle orifice of the water cooling wall, and the boiler unit had to be shut down and cleaned once a quarter. After carrying out the process of the present invention, the content of iron ions in the feed water keep stable at 0.5 µg/L for a long time, and there was no blocking of throttle orifice or the peeling off of the oxide skin from the high-temperature heated surface during a continuous operation of about 400 days. The amount of oxygen during the operation is listed below in table 1:

TABLE 1 amount of oxygen added during the operation of the supercritical unit

| oxygen-adding stage | amount of oxygen added | |
|---|---|---|
| | normal oxygenation converting stage | decreased oxygenation film-supplementing stage |
| amount of oxygen added in the condensate system | 50 μg/L~150 μg/L | 50 μg/L~150 μg/L |
| amount of oxygen added in the feed water system | 50 μg/L~150 μg/L | 5 μg/L~15 μg/L |

EXAMPLE 2

Regarding a high parameter drum type boiler, for example a 600 MW subcritical drum type boiler in Zhejiang Province, it had an average content of iron ions in the feed water of 4.89 μg/L, and a maximum of up to 10 μg/L, as well as a high speed of scaling on the water wall, before carrying out the process of the present invention. After performing the process of the present invention, the content of iron ions in the feed water keeps stable at 2.5 μg/L for a long time, and there was no peeling off of the oxide skin from the high temperature heating surface. The amount of oxygen added during the operation is listed below in table 2.

TABLE 2 the amount of oxygen added during the operation of the boiler

| oxygen-adding stage | amount of oxygen added | |
|---|---|---|
| | normal oxygenation converting stage | decreased oxygenation film-supplementing stage |
| amount of oxygen added in the condensate system | 50 μg/L~150 μg/L | 50 μg/L~150 μg/L |
| amount of oxygen added in the feed water system | 50 μg/L~150 μg/L | 5 μg/L~15 μg/L |

A detailed description has been made above regarding the oxygenated feed-water treatment of boilers in a power station provided by the present invention. The principle and embodiments of the present invention are illustrated by specific examples, but these examples are provided merely for the purpose of facilitating the understanding of the process of the present invention and the core concept thereof. It should be noted that many improvements and modifications can be made to the present invention for those skilled in the art without departing from the principle of the present invention, and they fall into the scope of protection defined by the claims as attached to the present invention.

The invention claimed is:

1. A process of oxygenated feed-water treatment of boilers comprising:
   oxygenating a boiler feed water system in a first stage to form an oxide film in the boiler feed water system by adding oxygen into a circulating feed water of the boiler feed water system both at the outlet of a condensate polishing system of a low pressure feed water system and at the inlet of a feed water pump of a high pressure feed water system downstream of the outlet of the condensate polishing system, such that the amount of oxygen at the outlet of the condensate polishing system and at the inlet of the feed water pump are both 50-150 μg/L in the first stage and the concentration of dissolved oxygen in a main steam generated from the circulating feed water is controlled to be ≤5 μg/L in the first stage;
   determining that the oxide film in the boiler feed water system has been formed; and
   after determining that the oxide film has been formed, supplementing and maintaining, in a second stage, the oxide film by adjusting the oxygen addition or an oxygen exhaust at a deaerator upstream of the inlet of the feed water pump and downstream of the outlet of the condensate polishing system to reduce the amount of oxygen at the inlet of the feed water pump to the high pressure feed water system while maintaining the amount of oxygen at the outlet of the condensate polishing system at 50-150 μg/L, wherein the concentration of dissolved oxygen in the main steam is controlled to be ≤5 μg/L in the second stage.

2. The process of claim 1, wherein the amount of oxygen at the inlet of the feed water pump of the high pressure feed water system is reduced to ≤30 μg/L in the second stage.

3. The process of claim 1, wherein determining that the oxide film has been formed comprises determining that the concentration of iron ions in the high pressure feed water system is stable at ≤1 μg/L, and that the amount of dissolved oxygen therein is 95%-100% of the amount of oxygen at the inlet of the feed water pump of the high pressure feed water system.

4. The process of claim 1, wherein the boiler is a mono-tube boiler or a drum boiler.

* * * * *